United States Patent
Land et al.

(10) Patent No.: US 10,026,451 B2
(45) Date of Patent: *Jul. 17, 2018

(54) VIDEO CAMERA WITH CAPTURE MODES

(71) Applicant: RED.COM, LLC, Irvine, CA (US)

(72) Inventors: Peter Jarred Land, Los Angeles, CA (US); James H. Jannard, Las Vegas, NV (US)

(73) Assignee: RED.COM, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,712

(22) Filed: Nov. 22, 2016

(65) Prior Publication Data
US 2017/0163861 A1 Jun. 8, 2017

Related U.S. Application Data

(63) Continuation of application No. 14/677,702, filed on Apr. 2, 2015, now Pat. No. 9,536,150.
(Continued)

(51) Int. Cl.
*H04N 9/80* (2006.01)
*G11B 27/10* (2006.01)
(Continued)

(52) U.S. Cl.
CPC .......... *G11B 27/10* (2013.01); *G06K 9/00711* (2013.01); *G06K 9/00724* (2013.01);
(Continued)

(58) Field of Classification Search
CPC ............... H04N 19/46; H04N 5/23229; H04N 5/23293; H04N 5/772; H04N 5/91;
(Continued)

(56) References Cited

U.S. PATENT DOCUMENTS 5,153,730 A 10/1992 Nagasaki et al.
5,778,108 A 7/1998 Coleman
(Continued)

FOREIGN PATENT DOCUMENTS

EP 3 127 322 2/2017
JP 2004133536 4/2004
(Continued)

OTHER PUBLICATIONS

European Search Report for European Patent Application No. 15772868.4 dated Feb. 9, 2017.
(Continued)

*Primary Examiner* — Robert Chevalier
(74) *Attorney, Agent, or Firm* — Knobbe Martens Olson & Bear LLP

(57) ABSTRACT

Embodiments provide a video camera that can be configured to allow tagging of recorded video and/or capture of video segments or sequences of images in response to user actuation of a camera control identifying an event of interest. For example, a user may press a button on the camera when an event of interest occurs, and in response the camera may tag a captured video file at a timestamp corresponding to the event. In another example, the user may initiate capture of video segments or sequences of images at an occurrence of an event of interest by pressing a button. The camera may include an image data buffer that may enable capture of video segments and/or sequences of images occurring before the user initiates capture of the event. User interfaces may enable the user to quickly review the captured video or sequences of images of the events of interest.

26 Claims, 8 Drawing Sheets

Related U.S. Application Data

(60) Provisional application No. 61/975,639, filed on Apr. 4, 2014.

(51) Int. Cl.
| | |
|---|---|
| *H04N 19/46* | (2014.01) |
| *G06K 9/00* | (2006.01) |
| *H04N 5/232* | (2006.01) |
| *H04N 5/77* | (2006.01) |
| *H04N 5/91* | (2006.01) |
| *H04N 9/804* | (2006.01) |
| *H04N 9/82* | (2006.01) |
| *G11B 27/28* | (2006.01) |
| *G11B 27/34* | (2006.01) |

(52) U.S. Cl.
CPC ........... *G11B 27/28* (2013.01); *G11B 27/34* (2013.01); *H04N 5/23229* (2013.01); *H04N 5/23293* (2013.01); *H04N 5/772* (2013.01); *H04N 5/91* (2013.01); *H04N 9/8042* (2013.01); *H04N 9/8205* (2013.01); *H04N 19/46* (2014.11); *G06K 2009/00738* (2013.01)

(58) Field of Classification Search
CPC ........... H04N 9/8042; H04N 9/8205; G06K 9/00711; G06K 9/00724; G06K 2009/00738; G11B 27/10; G11B 27/28; G11B 27/34
USPC .................. 386/241, 239, 248, 278, 326
See application file for complete search history.

(56) References Cited

U.S. PATENT DOCUMENTS

| | | | |
|---|---|---|---|
| 5,897,228 A | 4/1999 | Schrock | |
| 6,546,207 B2 | 4/2003 | Wakui | |
| 7,102,670 B2 | 9/2006 | Seaman | |
| 7,403,224 B2 | 7/2008 | Fuller et al. | |
| 7,623,176 B2 | 11/2009 | Hoshino et al. | |
| 7,884,860 B2 | 2/2011 | Morioka et al. | |
| 8,400,548 B2 | 3/2013 | Blbrey et al. | |
| 8,934,045 B2 | 1/2015 | Karn et al. | |
| 9,224,045 B2 | 12/2015 | Land et al. | |
| 9,536,150 B2 | 1/2017 | Land et al. | |
| 2005/0053352 A1 | 3/2005 | McKain et al. | |
| 2005/0185823 A1 | 8/2005 | Brown et al. | |
| 2008/0094476 A1 | 4/2008 | Whitehead et al. | |
| 2009/0227285 A1 | 9/2009 | Bregman-Amitai et al. | |
| 2010/0091113 A1 | 4/2010 | Morioka et al. | |
| 2011/0262103 A1 | 10/2011 | Ramachandran et al. | |
| 2011/0263946 A1* | 10/2011 | el Kaliouby ......... A61B 5/1128 600/300 |
| 2011/0295851 A1 | 12/2011 | El-Saban et al. | |
| 2013/0002890 A1 | 1/2013 | Sauerwein, Jr. et al. | |
| 2013/0093832 A1 | 4/2013 | Konda | |
| 2014/0072281 A1 | 3/2014 | Cho | |
| 2014/0245152 A1 | 8/2014 | Carter et al. | |

FOREIGN PATENT DOCUMENTS

| | | |
|---|---|---|
| JP | 2010288160 | 12/2010 |
| KR | 10-2008-0065146 | 7/2008 |
| KR | 10-2010-0124980 | 11/2010 |
| KR | 10-2013-0127754 | 11/2013 |

OTHER PUBLICATIONS

International Search Report and Written Opinion for PCT Application No. PCT/US2015/023509, dated Aug. 21, 2015.
"GoPro Introduces HERO4—The Most Powerful GoPro Lineup, Ever"; Press Release by GoPro; dated Sep. 29, 2014.
"HERO4 Black User Manual"; PDF document; PDF metadata indicates a creation date of Jan. 29, 2015; downloaded from http://gopro.com/support/hero4-black-support on Aug. 26, 2015.
Screen shot from https://www.youtube.com/watch?v=bAymmOf1SFo; printed on Aug. 26, 2015; video titled "GoPro HERO4: Introducing HiLight Tag"; video published on Nov. 11, 2015.
Examination Report for European Patent Application No. 15772868.4 dated Dec. 14, 2017.
Examination Report for European Patent Application No. 15772868.4 dated May 28, 2018.

* cited by examiner

VIDEO CAMERA WITH CAPTURE MODES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/677,702, filed Apr. 2, 2015, and titled "VIDEO CAMERA WITH CAPTURE MODES," which application claims benefit of U.S. Provisional Patent Application No. 61/975,639, filed Apr. 4, 2014, and titled "VIDEO CAMERA WITH CAPTURE MODES." The entire disclosure of each of the above items is hereby made part of this specification as if set forth fully herein and incorporated by reference for all purposes, for all that it contains.

BACKGROUND

Field of the Inventions

The present inventions are directed to digital cameras, such as those for capturing still or moving pictures, and more particularly, to digital cameras that capture image data in response to user inputs.

SUMMARY

The systems, methods, and devices described herein each have several aspects, no single one of which is solely responsible for its desirable attributes. Without limiting the scope of this disclosure, several non-limiting features will now be described briefly.

In an embodiment, a camera allows a user to initiate tagging of recorded video corresponding to an event of interest. For example, the user may press a button or interact with a camera touch screen on the camera when the event occurs. In response the camera tags the video file (for example, via metadata tagging, and/or the like), e.g., at a timestamp corresponding to the event, in order to identify for later viewing a certain number of image frames captured before, during, and after the event.

In some embodiments, the camera allows for the capture of video segments or sequences of images in response to user actuation of a camera control identifying an event of interest, e.g., where the camera is in a preview mode or is otherwise not continuously recording video except in response to the actuation of the control. For example, the user presses a button or interacts with a touch screen causing the camera to initiate recording of a video segment or sequence of images surrounding and/or including the time of the event. For instance, in the preview mode the camera writes captured images to an image data buffer, where the images are discarded relatively quickly after capture, e.g., after display on a monitor or after outputting off-camera for viewing. Actuation of the control causes the camera to output images from the buffer for persistent recording and later viewing. Due to the buffering, images can be recorded that were taken both before and after the user initiates capture of the event. In various embodiments, user interfaces may enable the user to quickly review the captured video or sequences of images corresponding to the events of interest.

According to an embodiment, a method of recording image data is disclosed, the method comprising: continuously acquiring image data by one or more image sensors of a video camera; temporarily storing the acquired image data in an image data buffer; in response to receiving a first user input identifying a first event of interest as the image data is continuously acquired, recording to an image data file: the acquired image data in the image data buffer that was acquired prior to the first user input; and a portion of image data continuously acquired after the first user input; and in response to receiving a second user input identifying a second event of interest as the image data is continuously acquired, appending to the image data file: the acquired image data in the image data buffer that was acquired prior to the second user input; and a portion of image data continuously acquired after the second user input.

According to an aspect, the image data buffer is configured to store image data corresponding to a particular period of time or a particular number of frames.

According to another aspect, the image data comprises at least one of video data or sequences of image data.

According to yet another aspect, the image data file is useable for visual presentation of the sequences of images.

According to another aspect, the image data file is recorded on the video camera.

According to yet another aspect, the first user input is received by at least one of a button, a touch-sensitive display, or an audio input.

According to another aspect, a portion of the acquired image data in the image data buffer is recorded to the image data file.

According to yet another aspect, the image data is acquired at a resolution of at least 1080p.

According to another aspect, the image data is acquired at a horizontal resolution of between 2 k and 10 k.

According to yet another aspect, the image data is acquired at a framerate of at least 12 frames per second.

According to another aspect, the image data is acquired at a framerate between 12 and 250 frames per second.

According to yet another aspect, further in response to the receiving the first user input identifying the first event of interest as the image data is continuously acquired: generating an indication of the first event of interest; and recording the indication to the image data file.

According to another aspect, the indication of the first event of interest includes a time stamp that indicates a time at which the in first user input was received.

According to yet another aspect, the indication of the first event of interest includes metadata indicating an association between the indication of the first event of interest and the image data that was acquired prior to the first user input and the portion of image data continuously acquired after the first user input.

According to another embodiment, a method of storing image data is disclosed, the method comprising: continuously acquiring image data by one or more image sensors of a video camera; and in response to receiving user inputs identifying events of interest as the image data is continuously acquired, generating an image data file including sequences of images associated with each of the identified events of interest; and storing the image data file, wherein the image data file is useable by the video camera for visual presentation of images associated with each of the identified events of interest.

According to an aspect, the image data file is useable by the video camera for visual presentation of image thumbnails in combination with a timeline of the identified events of interest.

According to another aspect, the image data file is useable by another computing device for visual presentation of images associated with each of the identified events of interest.

According to yet another aspect, the user inputs are received by at least one of a button, a touch-sensitive display, or an audio input.

According to yet another embodiment, a video camera comprises: one or more image sensors configured to continuously acquire image data; an image data buffer configured to temporarily store a continuously updated portion of the continuously acquired image data; and an image processor configured to, in response to receiving a first user input identifying a first event of interest as the image data is continuously acquired, appending to an existing image data file: the acquired image data in the image data buffer that was acquired prior to the first user input; and a portion of image data continuously acquired after the first user input.

According to an aspect, a button is positioned so as to be accessible for interaction by a user of the video camera during acquisition of the image data to identify an occurrence of an event of interest.

According to another aspect, the image data buffer is configured to store image data corresponding to a particular period of time or a particular number of frames.

According to yet another aspect, the image data comprises at least one of video data or sequences of image data.

According to another aspect, the image data file is useable for visual presentation of the sequences of images.

According to yet another aspect, the image data file is recorded on the video camera.

According to another aspect, the first user input is received by at least one of a button, a touch-sensitive display, or an audio input.

According to yet another aspect, the image data is acquired at a resolution of at least 1080p.

According to another aspect, the image data is acquired at a horizontal resolution of between 2 k and 10 k.

According to yet another aspect, the image data is acquired at a framerate of at least 12 frames per second.

According to another aspect, the image data is acquired at a framerate between 12 and 250 frames per second.

According to yet another aspect, the image processor is further configured to, in response to the receiving the first user input identifying the first event of interest as the image data is continuously acquired: generate an indication of the first event of interest; and append the indication to the image data file.

According to another aspect, the indication of the first event of interest includes a time stamp that indicates a time at which the in first user input was received.

According to yet another aspect, the indication of the first event of interest includes metadata indicating an association between the indication of the first event of interest and the image data that was acquired prior to the first user input and the portion of image data continuously acquired after the first user input.

According to another embodiment, a method of generating a user interface is disclosed, the method comprising: accessing, by one or more processors configured with computer-executable instructions, an image data file including a plurality of sequences of images, each of the sequences of images associated with events of interest identified by a user; generating, by the one or more processors, a user interface including: a timeline including indications of beginning and ending points associated with respective sequences of images; and one or more image thumbnails associated with one or more of the events of interest and selected from the sequences of images associated with the respective events of interest.

According to an aspect, the method further comprises: displaying the generated user interface on a camera on which the data file is stored, or by which the image data file was captured.

According to another aspect, moving a location indicator along the timeline causes the user interface to be updated to display image thumbnails associated with an event of interest indicated by the location indicator.

According to yet another aspect, the image timeline includes indication of moments at which a user identified respective events of interest.

According to yet another embodiment, a computer system comprises: one or more computer processors; and a computer readable storage medium configured to store: an image data file including a plurality of event indicators, each of the event indicators associated with an event of interest identified by a user; and program instructions configured for execution by the one or more computer processors in order to cause the computing system to: access the image data file including the plurality of event indicators; generate a user interface including one or more image thumbnails, each of the image thumbnails representative of one of the events of interest, each of the image thumbnails extracted from the image data file at a location corresponding to each respective associated event indicator; and display the user interface on a display of the computer system.

According to another embodiment, a method of generating a user interface comprises: accessing, by one or more processors configured with computer-executable instructions, an image data file including a plurality of event indicators, each of the event indicators associated with an event of interest identified by a user; and generating, by the one or more processors, a user interface including: one or more image thumbnails, each of the image thumbnails representative of one of the events of interest, each of the image thumbnails extracted from the image data file at a location corresponding to each respective associated event indicator.

According to an aspect, the user interface further includes: a timeline including indications of each of the plurality of event indicators.

According to yet another aspect, the method further comprises: displaying the generated user interface on a camera on which the data file is stored, or by which the image data file was captured.

According to another aspect, the method further comprises: wherein the events of interest are identified by a user of a camera on which the data file is stored in real-time.

According to yet another aspect, the method further comprises: wherein the events of interest are identified in real-time by selection of an event selector associated with the camera.

According to another aspect, the user interface further includes: two or more image thumbnails representative of an event of interest, at least one of the two or more thumbnails displaying an image captured immediately before or immediately after the event of interest.

According to yet another aspect, the user interface further includes: acquiring, by one or more sensors of a video camera, image data; receiving, via an event selector configured to be selectable by a user upon an occurrence of an event of interest, a first user input identifying a first event of interest as the image data is continuously acquired; storing the image data in the image data file; appending to the image data file an event indicator that is indicative of the first event of interest and associated with a time in the image data file at which the first input was received.

According to another aspect, each of the event indicators is associated with time stamps.

According to yet another aspect, the image data file includes image data at a resolution of at least 1080p.

According to another aspect, the image data file includes image data at a horizontal resolution of between 2 k and 10 k.

According to yet another aspect, the image data file includes image data at a framerate of at least 12 frames per second.

According to another aspect, the image data file includes image data at a framerate between 12 and 250 frames per second.

According to yet another embodiment, a video camera comprises: one or more image sensors configured to acquire image data; an event selector configured to be selectable by a user upon an occurrence of an event of interest as image data is acquired; and an image processor in communication with the one or more image sensors and the event selector, the image processor configured to: in response to receiving, via the event selector, a first user input identifying a first event of interest as the image data is continuously acquired, appending to an existing image data file an indication of the first event of interest.

According to an aspect, the existing image data file includes the image data that is continuously acquired.

According to another aspect, the indication includes a time stamp that indicates a time at which the first user input was received.

According to yet another aspect, the indication is appended to a beginning of the existing image data file.

According to another aspect, the indication is appended to an end of the existing image data file.

According to yet another aspect, the indication is appended to a middle portion of the existing image data file.

According to another aspect, the indication includes metadata indicating an association between the indication and the exiting image data file.

According to yet another aspect, the event selector comprises a button mounted on an external surface of the video camera.

According to another aspect, the video camera further comprises: a touch-sensitive display, wherein the event selector comprises a selectable element displayed on the touch-sensitive display.

According to yet another aspect, the image processor is further configured to: further in response to receiving the first user input, capturing, from the image data, a series of two or more still images of the first event of interest.

According to another aspect, the two or more still images are captured from the image data at a time in the image data corresponding a time at which the first user input was received.

According to yet another aspect, the image data is acquired at a resolution of at least 1080p.

According to another aspect, the image data is acquired at a horizontal resolution of between 2 k and 10 k.

According to yet another aspect, the image data is acquired at a framerate of at least 12 frames per second.

According to another aspect, the image data is acquired at a framerate between 12 and 250 frames per second.

According to yet another embodiment, a video camera is disclosed comprising: a portable housing; one or more image sensors within the housing configured to acquire motion picture image data at a frame rate; a storage device configured to store acquired motion picture image data in a video data file; a button positioned so as to be accessible for interaction by a user of the video camera during acquisition of the motion picture image data to identify an occurrence of an event of interest; an electronic display; and one or more processors configured to execute machine readable instructions in order to: receive an indication of user interaction with the button during acquisition of the motion picture image data identifying a first event of interest as the motion picture image data is continuously acquired; in response to receipt of the indication of user interaction with the button, append to the video data file an indication of the first event of interest; process the image data file; and based at least on the processing of the image data file, generate, for display on the electronic display a user interface including at least: a timeline representing at least a portion of the video data file; and a marker identifying a portion of the timeline corresponding to image data that corresponds to the first event of interest.

According to an aspect, the indication of the first event of interest includes a time stamp that indicates a time at which the indication of user interaction with the button was received.

According to another aspect, the indication of the first event of interest is appended to at least one of: a beginning of the video data file, an end of the video data file, or a middle portion of the video data file.

According to yet another aspect, the indication of the first event of interest includes metadata indicating an association between the indication of the first event of interest and the video data file.

According to another aspect, the button is mounted on an external surface of the video camera.

According to yet another aspect, the electronic display comprises a touch-sensitive display, and the button comprises a selectable element included in the user interface, the selectable element configured for interaction by the user off the video camera during acquisition of the motion picture image data to identify an occurrence of an event of interest.

According to another aspect, the one or more processors are configured to execute machine readable instructions in order to further: in response to receiving, via the user interface, a second indication of user interaction indicating a selection of the marker, updating the user interface to display a portion of the video data file associated with the first event of interest.

According to yet another aspect, the one or more processors are configured to execute machine readable instructions in order to further: further in response to receiving the indication of user interaction with the button, capturing, from the motion picture image data, a series of two or more still images of the first event of interest.

According to another aspect, the two or more still images are captured from the acquired motion picture image data at a time in the motion picture image data corresponding a time at which the indication of user interaction with the button was received.

According to yet another aspect, the motion picture image data is acquired at a resolution of at least 1080p.

According to another aspect, the motion picture image data is acquired at a horizontal resolution of between 2 k and 10 k.

According to yet another aspect, the framerate is at least 12 frames per second.

According to another aspect, the framerate is between 12 and 250 frames per second.

According to yet another aspect, the user interface further includes an image thumbnail representative of the first event of interest, the image thumbnail extracted from the video data file at a location corresponding to the indication of the first event of interest.

According to another aspect, the user interface further includes a two or more image thumbnails representative of the first event of interest, at least one of the two or more thumbnails displaying an image captured immediately before or immediately after the event of interest.

According to another embodiment, a method is disclosed comprising: acquiring, at a framerate, motion picture image data via one or more image sensors of a video camera, the video camera comprising a portable housing, the one or more image sensors within the housing, an electronic display, and a storage device; storing, in the storage device of the video camera, the acquired motion picture image data as a video data file; receiving, via a button of the video camera positioned so as to be accessible for interaction by a user of the video camera during acquisition of the motion picture image data, an indication of user interaction identifying a first event of interest as the motion picture image data is continuously acquired via the one or more image sensors of the video camera; appending, to the video data file, an indication of the first event of interest; and processing the video data file; and based at least on said processing, generating, for display on the electronic display of the video camera, a user interface including at least: a timeline representing at least a portion of the video data file; and a marker on the timeline representing the first event of interest.

According to an aspect, the indication of the first event of interest includes a time stamp that indicates a time at which the indication of user interaction with the button was received.

According to another aspect, the button is mounted on an external surface of the video camera.

According to yet another aspect, the electronic display comprises a touch-sensitive display, and the button comprises a selectable element included in the user interface, the selectable element configured for interaction by the user off the video camera during acquisition of the motion picture image data to identify an occurrence of an event of interest.

According to another aspect, in response to receiving, via the user interface, a second indication of user interaction indicating a selection of the marker, updating the user interface to display a portion of the video data file associated with the first event of interest.

According to yet another aspect, in response to receiving the indication of user interaction with the button, capturing, from the motion picture image data, a series of two or more still images of the first event of interest.

According to another aspect, the two or more still images are captured from the acquired motion picture image data at a time in the motion picture image data corresponding a time at which the indication of user interaction with the button was received.

According to yet another aspect, the motion picture image data is acquired at a resolution of at least 1080p.

According to another aspect, the framerate is between 12 and 250 frames per second.

According to yet another embodiment, a computing system is disclosed comprising: a computer processor; and a computer readable storage medium configured to store: an image data file including: image data acquired via one or more image sensors of a video camera; and an indication of an event of interest, the indication having been added to the image data file in response to an input from a user identifying an event of interest as the image data was continuously acquired; and program instructions configured for execution by the computer processor in order to cause the computing system to: process the image data file to generate a user interface including at least: a timeline representing at least a portion of the image data file; a first marker identifying a portion of the timeline corresponding to image data acquired at or near the event of interest; a second marker identifying a portion of the timeline corresponding to image data acquired before the event of interest; and a third marker identifying a portion of the timeline corresponding to image data acquired after the event of interest.

According to an aspect, the second marker is located on the timeline so as to indicate a point in time occurring before the event of interest.

According to another aspect, the third marker is located on the timeline so as to indicate a point in time occurring after the event of interest.

According to yet another aspect, the user interface further includes at least an image thumbnail associated with at least one of the first marker, the second marker, or the third marker.

According to another aspect, the program instructions are configured for execution by the computer processor in order to cause the computing system to further: in response to a user input indicating selection of one of the first, second, or third markers, update the user interface to further include image data associated with the respective selected first, second, or third marker.

According to yet another aspect, the program instructions are configured for execution by the computer processor in order to cause the computing system to further: in response to a user input indicating selection of a play button, cause presentation of the image data associated with at least the first event of interest.

According to another embodiment, a method of selectively recording image data associated with an event of interest is disclosed, the method comprising: continuously acquiring image data by one or more image sensors of a video camera; temporarily storing the acquired image data in an image data buffer; in response to receiving a first user input identifying a first event of interest as the image data is continuously acquired, recording to an image data file: at least a portion of the acquired image data in the image data buffer that was acquired prior to the first user input; and at least a portion of image data continuously acquired during or after the first user input; in response to receiving a second user input identifying a second event of interest as the image data is continuously acquired, appending to the image data file: at least a portion of the acquired image data in the image data buffer that was acquired prior to the second user input; and at least a portion of image data continuously acquired during or after the second user input; and discarding remaining portions of the acquired image data temporarily stored in the buffer that are not recorded to the image data file, without recording the remaining portions using the video camera.

According to an aspect, the method further comprises providing the image data temporarily stored in the buffer to an output of the camera, wherein the output can be connected to an electronic display for monitoring the continuously acquired image data.

According to another aspect, the method further comprises, subsequent to said recording, appending, and discarding, and in response to user selection of a continuous record mode, recording the data acquired in the image data buffer using the video camera, without discarding the acquired image data.

According to yet another aspect, the image data buffer is configured to store image data corresponding to a particular period of time or a particular number of frames.

According to another aspect, the image data comprises at least one of video data or sequences of image data.

According to yet another aspect, the image data file is useable for visual presentation of the sequences of images.

According to another aspect, the image data file is recorded on the video camera.

According to yet another aspect, the first user input is received by at least one of a button, a touch-sensitive display, or an audio input.

According to another aspect, the image data is acquired at a resolution of at least 1080p.

According to yet another aspect, the image data is acquired at a horizontal resolution of between 2 k and 10 k.

According to another aspect, the image data is acquired at a framerate of at least 12 frames per second.

According to yet another aspect, the image data is acquired at a framerate between 12 and 250 frames per second.

According to another aspect, the method further comprises: further in response to the receiving the first user input identifying the first event of interest as the image data is continuously acquired: generating an indication of the first event of interest; and recording the indication to the image data file.

According to yet another aspect, the indication of the first event of interest includes a time stamp that indicates a time at which the in first user input was received.

According to another aspect, the indication of the first event of interest includes metadata indicating an association between the indication of the first event of interest and the image data that was acquired prior to the first user input and the portion of image data continuously acquired after the first user input.

According to yet another embodiment, a video camera is disclosed comprising: one or more image sensors configured to continuously acquire image data; an image data buffer configured to temporarily store the continuously acquired image data; and an image processor configured to, in response to receiving a first user input identifying a first event of interest as the image data is continuously acquired, write to an existing image data file: at least a portion of the acquired image data in the image data buffer that was acquired prior to the first user input; and at least a portion of image data continuously acquired during or after the first user input.

According to an aspect, the image processor is further configured to discard remaining portions of the acquired image data temporarily stored in the image data buffer that are not written to the existing image data file without recording the remaining portions using the video camera.

According to another aspect, the image processor is further configured to, in response to receiving a second user input identifying a second event of interest as the image data is continuously acquired, append to the existing image data file at least a portion of the acquired image data in the image data buffer that was acquired prior to the second user input, wherein the portion of the acquired image data in the image data buffer that was acquired prior to the second user input is appended to at least one of: a beginning of the existing image data file, an end of the existing image data file, or a middle portion of the existing image data file.

According to yet another aspect, the video camera further comprises: a button positioned so as to be accessible for interaction by a user of the video camera during acquisition of the image data to identify an occurrence of an event of interest.

According to another aspect, the image data buffer is configured to store image data corresponding to a particular period of time or a particular number of frames.

According to yet another aspect, the image data comprises at least one of video data or sequences of image data.

According to another aspect, the image data file is useable for visual presentation of the sequences of images.

According to yet another aspect, the image data file is recorded on the video camera.

According to another aspect, the first user input is received by at least one of a button, a touch-sensitive display, or an audio input.

According to yet another aspect, the image data is acquired at a resolution of at least 1080p.

According to another aspect, the image data is acquired at a horizontal resolution of between 2 k and 10 k.

According to yet another aspect, the image data is acquired at a framerate of at least 12 frames per second.

According to another aspect, the image data is acquired at a framerate between 12 and 250 frames per second.

According to yet another aspect, the image processor is further configured to, in response to the receiving the first user input identifying the first event of interest as the image data is continuously acquired: generate an indication of the first event of interest; and append the indication to the image data file.

According to another aspect, the indication of the first event of interest includes a time stamp that indicates a time at which the in first user input was received.

According to yet another aspect, the indication of the first event of interest includes metadata indicating an association between the indication of the first event of interest and the image data that was acquired prior to the first user input and the portion of image data continuously acquired after the first user input.

According to another embodiment, method of selectively recording image data is disclosed, the method comprising: continuously acquiring image data by one or more image sensors of a video camera; temporarily storing the acquired image data in an image data buffer; and in response to receiving a first user input identifying a first event of interest as the image data is continuously acquired, recording, to an existing image data file, at least a portion of the acquired image data in the image data buffer corresponding to the first event of interest.

According to an aspect, the method further comprises: discarding remaining portions of the acquired image data temporarily stored in the buffer that are not recorded to the existing image data file, without recording the remaining portions using the video camera According to another aspect, the at least a portion of the acquired image data in the image data buffer that is recorded comprises image data acquired before receiving the first user input.

According to yet another aspect, the at least a portion of the acquired image data in the image data buffer that is recorded comprises image data acquired before and during receipt of the first user input.

According to another aspect, the at least a portion of the acquired image data in the image data buffer that is recorded comprises image data acquired after receiving the first user input.

According to yet another aspect, the at least a portion of the acquired image data in the image data buffer that is recorded comprises image data acquired before, during, and after receipt of the first user input.

According to various embodiments, a computer system may be configured to execute software instructions so as to perform any of the methods and/or processes disclosed herein.

According to various embodiments, a computer program may comprise machine-readable instructions that when executed by a computer apparatus control it to perform any of the methods and/or processes disclosed herein.

According to various embodiments, an apparatus may be configured to perform any of the methods, processes, and/or systems disclosed herein.

According to various embodiments, a computer readable medium may have stored thereon machine-readable instructions that when executed by a computer apparatus control it to perform any of the methods and/or processes disclosed herein.

BRIEF DESCRIPTION OF THE DRAWINGS

The following aspects of the disclosure will become more readily appreciated as the same become better understood by reference to the following detailed description, when taken in conjunction with the accompanying drawings.

DETAILED DESCRIPTION

Overview

Figure 1A:
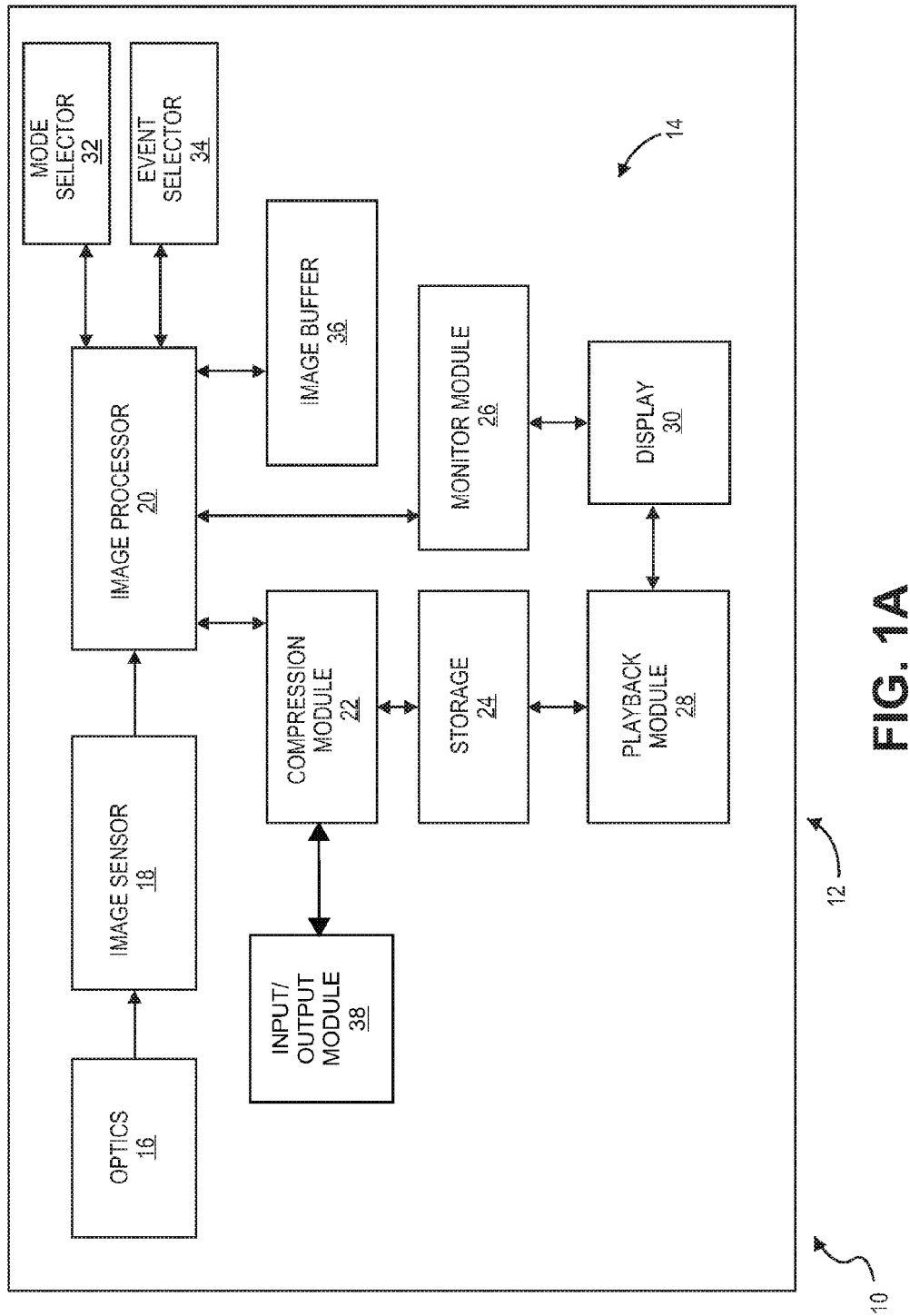
FIG. 1A is a block diagram illustrating a system that can include hardware and/or can be configured to perform methods for processing image data, in accordance with various embodiments.

In various embodiments, the present disclosure describes systems and methods of tagging image data (for example, videos, images, sequences of images, and/or the like) in response to user inputs. User interfaces and associated methods are also disclosed which present the tagged image data in a manner that facilitates review of the tagged images.

The camera may include two user-selectable modes: 1) a "video tagging mode" in which the user may initiate tagging of select portions of continuous recorded video; and 2) a "burst mode" in which the camera does not record video to memory until a user initiates capture of video segments or sequences (or "bursts") of images.

In some embodiments, the "video tagging mode" can enable the user to identify events of interest while simultaneously recording video. The camera can mark the file with appropriate tagging metadata such that the camera or other separate device can later access the recorded video file, identify the tagged portions of the video, and generate a graphical interface that allows the user to quickly navigate to and/or among the tagged events when reviewing the video. In various embodiments, when the camera is operating in the "video tagging mode" the video may be captured at a selected quality level (for example, at a selected resolution, frame rate, compression level, and/or the like).

The "burst mode" can enable the user to actuate a control to initiate selective recording of video segments or other sequences of images. For instance, the camera can be in a preview mode where it is not otherwise continuously recording video, and only outputs video for recording to storage in response to the actuation of the control. In this mode, buffered image frames captured both before and after an event of interest are in some embodiments output to storage for recording in response to user actuation of the control. In an embodiment, multiple recorded video segments/sequences of images are stored as a single file, allowing a user to compile a series of "clips" corresponding to selected events in a common location for later browsing. The file can be formatted such that user can later quickly review and/or navigate among the recorded images, e.g., quickly toggle between clips corresponding to multiple events. In some embodiments, when the camera is operating in the "burst mode" the video segments/sequences of images are captured at a maximum or other relatively high quality level (for example, a maximum resolution, a maximum frame rate, a minimum compression level, and/or the like). Such a quality level may be sufficiently high so that continuous recording at that quality level would not be sustainable due to hardware throughput and/or storage capacity constraints. However, in the burst mode the camera is not outputting video to storage for continuous recording, and is instead only outputting images to storage when the user initiates a burst recording, which will occur intermittently. Moreover, a limited number of image frames will be output to storage for any given burst (e.g., no more than the maximum number of images that can be stored in the image data buffer). Thus, in the burst mode recording may be possible at the maximum (or relatively high) quality level.

In an embodiment, the camera may be configured to simultaneously record continuous video at a sustainable quality level, while recording sequences (or "bursts") of images at a different quality level (e.g., a higher quality level) in response to a user input. Such continuous video and sequences of images may advantageously be stored together within a single file. The single file may be useable for fast review of recorded events of interest, as described herein.

Example System/Camera

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

With reference to FIG. 1A, an example camera 10 is shown that includes a body or housing 12 configured to support a system 14 configured to detect, process, and optionally transfer, store, and/or replay image data. For example, the system 14 can include optics hardware 16, an image sensor 18, an image processor 20, a compression module 22, a storage device 24, a mode selector 32, an event selector 34, an image buffer 36, and an input/output module 38. Optionally, the camera 10 may also include a monitor module 26, a playback module 28, and a display 30.

Figure 1B:
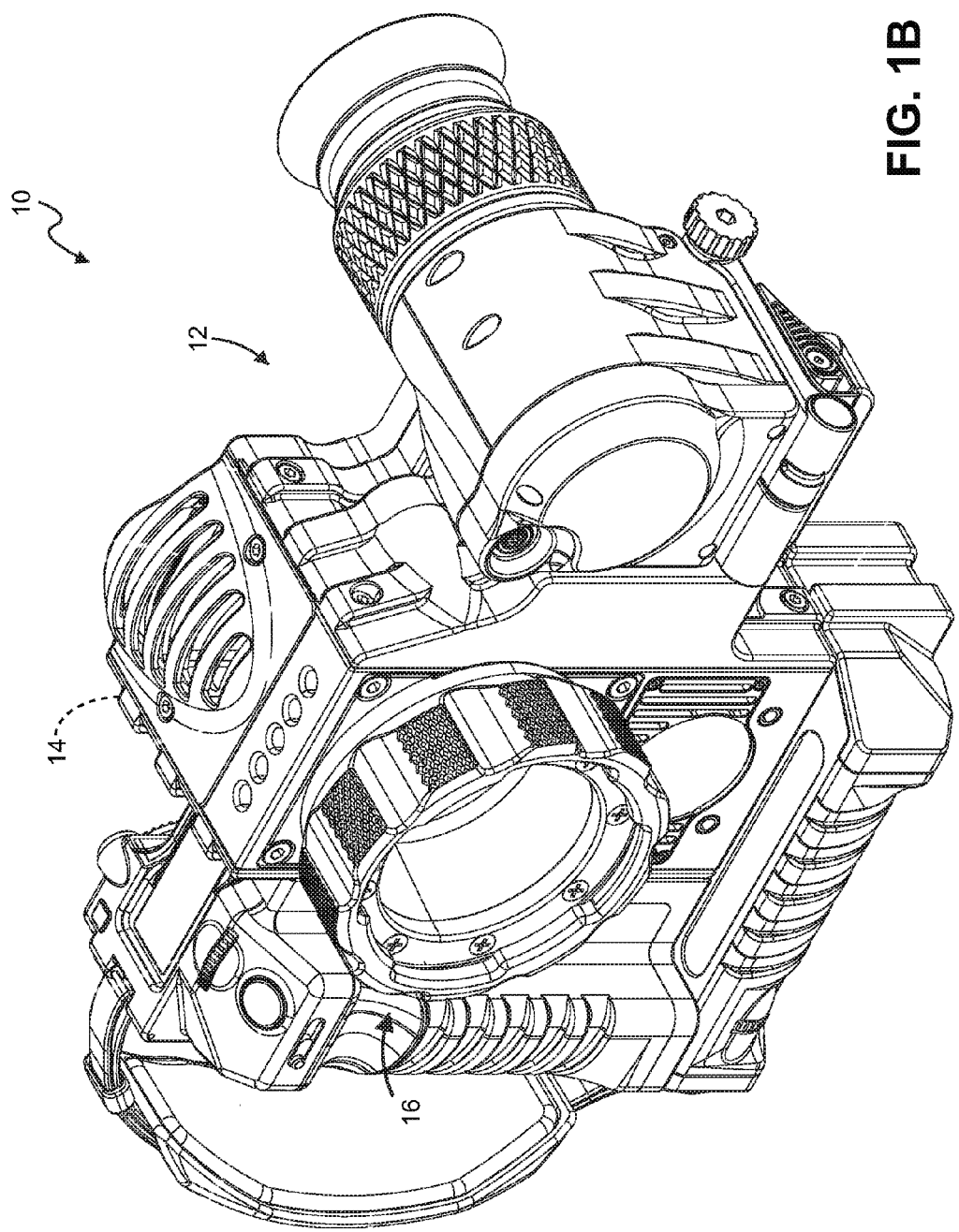
FIG. 1B is an exemplary embodiment of a housing for the system schematically illustrated in FIG. 1A.

FIG. 1B illustrates a non-limiting exemplary embodiment of the camera 10. As shown in FIG. 1B, the camera can include a lens mount for mounting the optics hardware 16 (not shown) to the camera 10. In some embodiments, the system 14 is supported within the housing 12. For example, the image sensor 18, image processor 20, the compression module 22, the image buffer 36, and the input/output module 28 may be housed within the housing 12. The storage device 24 may be mounted in the housing 12. Additionally, in some embodiments, the storage device 24 may be mounted to an exterior of the housing 12 and connected to the remaining portions of the system 14 via the input/output module 38 and through any type of known connector or cable. Additionally, the storage device 24 may be connected to the housing 12 with a flexible cable, thus allowing the storage device 24 to be moved somewhat independently from the housing 12. For example, with such a flexible cable connection, the storage device 24 can be worn on a belt of a user, allowing the total weight of the housing 12 to be reduced. Further, in some embodiments, the housing can include one or more storage devices 24 inside and mounted to its exterior. Additionally, the housing 12 can also support the monitor module 26, and playback module 28. Additionally, in some embodiments, the display 30 can be configured to be mounted to an exterior of the housing 12.

The optics hardware 16 may be in the form of a lens system having at least one lens configured to focus an incoming image onto the image sensor 18. The optics hardware 16, optionally, can be in the form of a multi-lens system providing variable zoom, aperture, and focus. Additionally, the optics hardware 16 can be in the form of a lens socket supported by the housing 12 and configured to receive a plurality of different types of lens systems for example, but without limitation, the optics hardware 16 include a socket configured to receive various sizes of lens systems including a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, and/or any other lens. As noted above, the optics hardware 16 can be configured such that despite which lens is attached thereto, images can be focused upon a light-sensitive surface of the image sensor 18.

The image sensor 18 can be any type of video sensing device, including, for example, but without limitation, CCD, CMOS, vertically-stacked CMOS devices such as the Foveon® sensor, or a multi-sensor array using a prism to divide light between the sensors. In some embodiments, the image sensor 18 can include a CMOS device having about 12 million photocells. However, other size sensors can also be used. In some configurations, camera 10 can be configured to record and/or output video (e.g., compressed raw video) at "2 k" (e.g., 2048×1152 pixels), "4 k" (e.g., 4,096× 2,540 pixels), "4.5 k" horizontal resolution, "5 k" horizontal resolution (e.g., 5120×2700 pixels), "6 k" horizontal resolution (e.g., 6144×3160), or greater resolutions. In some embodiments, the camera can be configured to record compressed raw image data having a horizontal resolution of between at least any of the above-recited resolutions. In further embodiments, the resolution is between at least one of the aforementioned values (or some value between the aforementioned values) and about 6.5 k, 7 k, 8 k, 9 k, or 10 k, or some value there between. As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels. Using currently commercially available hardware, the sensor can be as small as about 0.5 inches (8 mm), but it can be about 1.0 inches, or larger. Additionally, the image sensor 18 can be configured to provide variable resolution by selectively outputting only a predetermined portion of the sensor 18. For example, the sensor 18 and/or the image processor module 20 can be configured to allow a user to identify the resolution of the image data output.

In some embodiments, the image sensor 18 and/or other components of the camera 10 may be configured to capture and/or process continuous image data, for example, at frame rates of 12, 20, 23.98, 24, 25, 29.97, 30, 47.96, 48, 50, 59.94, 60, 120, 250, 500, 1000, 2000, 2500, 5000, 10000 frames per second, or other frame rates between these frame rates or greater.

The camera 10 can also be configured to downsample and subsequently process the output of the sensor 18 to yield video output at 2K, 1080p, 720p, or any other resolution. For example, the image data from the sensor 18 can be "windowed", thereby reducing the size of the output image and allowing for higher readout speeds. However, other size sensors can also be used. Additionally, the camera 10 can be configured to upsample the output of the sensor 18 to yield video output at higher resolutions.

In various embodiments, a user of the camera 10 may configure the camera to capture and/or record image data at any of a number of selectable quality levels. For example, the image processor 20 and/or the compression module 22 may be configured to capture and/or record image data at particular resolutions, frame rates, and/or any other quality level as described above. As also described above, in various embodiments the camera 10 may operate in a "video tagging mode" and/or a "burst mode". In various embodiments, when the camera is operating in the "video tagging mode" the video may be output to storage for recording at a sustainable quality level for continuous recording, while when the camera is operating in the "burst mode" the video segments/sequences of images may be output to storage for recording at a relatively high quality level. The user may configure the sustainable and/or the maximum quality levels. In an embodiment, at the quality level used in the "burst mode" the camera outputs uncompressed raw image data and at the sustainable quality level used during the "video tagging mode" the camera records compressed raw image data. In another embodiment, at the quality level used in the "burst mode" the camera outputs raw image data (either compressed or uncompressed) and at the sustainable quality level used during the "video tagging mode" the camera records non-raw image data.

In various embodiments, image data may be processed according to any of the techniques described in U.S. Pat. No. 7,830,967 entitled "VIDEO CAMERA" (the '967 patent), which is incorporated by reference herein. For instance, the image processor 20, the compression module 22, and/or the image sensor 18 may perform pre-compression data-preparation (e.g., pre-emphasis and/or entropy reduction), format the compressed data, and/or the like. In some instances, the image processor 20 processes the image data according to one or more techniques such as green data modification and/or pre-emphasis processes as shown and described throughout the '967 patent (e.g., with respect to FIGS. 8-11 and columns 11-13 of the '967 patent). In general, certain embodiments described herein are compatible with and/or are components of embodiments described in the '967 patent.

In various embodiments, the mode selector 32 and/or the event selector 34 may be externally mounted to the housing 12. For example, the mode selector 32 and/or the event selector 34 may comprise buttons and/or switches. In an embodiment the mode selector 32 and/or the event selector 34 may comprise selection elements displayed on a touch-sensitive display, for example the display 30. In an embodiment, the mode selector 32 and/or the event selector 34 may be activated by a voice command and/or another audio indication. In an embodiment, the mode selector 32 may be usable by a user of the camera 10 to indicate a mode of operation of the camera, for example, either the "video tagging mode" or the "burst mode" described above. In an embodiment, the event selector 34 may be useable by the user to indicate the occurrence of an event of interest. Accordingly, selection of the event selector 34 may cause the camera to tag captured video and/or capture video segments or sequences of images, depending on the mode of operation of the camera 10. In some embodiments, the camera 10 is configured to automatically tag a video file, or capture a burst of images, in response to detected triggering conditions other than a user-actuated control. For example, the camera 10 may be configured to tag portions of a video file, or capture a burst of images, in response to detected events, received data, and/or the like. For example, in an embodiment the image processor 20 may be configured to detect particular events, such as movements of objects or movements of objects of a particular speed. In response to detecting such events, the camera 10 may automatically tag a video file or capture a burst of images. In some embodiments a tag may be associated with additional related data including, for example, location data, color data, contrast data, and/or the like. For example, a tag may be associated with data indicating a location of the camera, or color or contrast (or other camera setting) data when the video file was tagged.

In various embodiments the image buffer 36 may be used to temporary storage of captured image data. For example, the image processor 20 may use the image buffer 36 as temporary storage for recently captured image data received from the image sensor, to facilitate processing prior to delivery to storage 24, input/output module 38, monitor module 26, or the like, either directly, or indirectly, e.g., via the compression module 22, as shown. The image buffer 36 may comprise, for example, a volatile and/or non-volatile electronic memory (for example, RAM, SDRAM, a hard disk drive, a flash disk, flash memory, a solid state drive, or some other type of storage). The image buffer 36 may be any size including, for example, 100 MB, 250 MB, 500 MB, 1 GB, or larger. A relatively larger image buffer 36 enables temporary storage of relatively more frames of image data than a relatively smaller image buffer 36. The image buffer 36 may retain and discard data on a first in, first out basis. Accordingly, as the camera 10 captures new image data it may continuously insert the newly captured image data into the image buffer 36 while removing older image data from the image buffer 36. Depending on the embodiment, the camera 10 can further include one or more additional buffers, such as an integrated frame buffer within the image sensor 18.

When operating in continuous video recording modes, the image processor 20 may generally use the image buffer 36 for temporary storage during processing, and send processed frames to the compression module 22 for recording in storage 24 (or in some cases directly to the storage 24, where compression is not used). The image processor 20 may additionally deliver the processed images for preview or other real time viewing purposes, e.g., to the monitor module 26 for display on an on-camera viewfinder, to the input/output module 38 for outputting a real-time feed to an external display, or the like. When in a continuous recording mode, the camera can advantageously tag certain portions of the recorded video in any of the manners discussed herein. In some embodiments, the camera 10 can also operate in a preview mode, where the image processor 20 delivers the processed images for preview or other real time viewing purposes. This mode may also be referred to as "a monitoring mode", a "preview-only mode", or "a monitoring-only mode", without limitation. In contrast to the recording modes, when the camera operates in the preview mode, the buffered image data may not ordinarily be persistently stored in the storage 24, except when a burst capture is triggered by the user in any of the manners described herein. Additionally, as described in further detail below, in some embodiments image data delivered for preview (or other real time viewing purposes) may be processed (e.g., by demosaicing, color correcting, etc.) so as to facilitate real time display (e.g., without significant further processing), while image data delivered to be recorded may be substantially unprocessed or raw image data (e.g., raw, mosaiced image data, which may be compressed or uncompressed, depending on the embodiment). The terms "unprocessed" and "raw" as used in this context can refer to data that has not undergone certain image processing operations like color correction, demosaicing, etc., but that may or may not have undergone certain other image processing operations described in the '967 patent such as pre-emphasis, green-average subtraction, and/or compression. For instance, compressed raw image data according to certain embodiments does not have "baked in" effect in which one or more steps have been performed resulting in a look that cannot be adjusted or undone in post-processing.

In an embodiment, input/output module 38 may be configured to allow transfer of image data to external storage (as described above). Or, the input/output module 38 may allow the user to transfer recorded image data or a live feed off camera, e.g., to an external computing device for viewing, storage, or processing. The input/output module 38 may implement a standard-compliant video interface, such as a High-Definition Multimedia Interface (HDMI), a high-definition serial digital interface (HD-SDI), or some other standard or non-standard interface.

In various embodiments, the camera 10 may further include one or more other hardware or software modules not explicitly shown. For example, the camera 10 may include an interface software module that may be executed by the image processor 20 (or another processor of the camera 10) to generate user interfaces as described herein. The user interfaces may be displayed on the display 30 or another display. Accordingly, in an embodiment, a user of the camera may review captured image data via the display 30. In an embodiment, image data may be transferred to a computing device external to the camera 10 (as described above) that may also include software modules that may generate user interfaces as described herein.

In various embodiments, the image processor 20 (or another processor of the camera 10) may be configured to insert tags into image data in response to user inputs indicating event selections (as described above) via, for example, the event selector 34. As described above, a tag may comprise a marker at a particular point (for example, a timestamp) in image data indicating an occurrence of an event of interest. Tags may also include information associated with an event of interest, for example, a location, a quality level, a textual notation, an audio notation, an image notation, a video notation, and/or the like. In various embodiments, tags may be associated with videos, video segments, and/or sequences of images.

Further, in various embodiments, the image processor 20 may be configured to operate in the "video tagging mode" and/or the "burst mode" (as described above) in response to user inputs via the mode selector 22. As described, when operating in the "burst mode", the image processor 20 may utilize the image buffer 36 for temporary storage of image data to facilitate processing, and, in response to a user indication of an event of interest, may store the image data from the buffer to the storage 24.

In some embodiments, the sensor 18 can include a Bayer pattern filter. As such, the sensor 18, by way of its chipset (not shown) outputs data representing magnitudes of red, green, or blue light detected by individual photocells of the image sensor 18. The chipset of the image sensor 18 can be used to read the charge on each element of the image sensor and thus output a stream of values in the well-known RGB format output. In various embodiments, the image processor 20 can be configured to format the data stream from the image sensor 18 in any manner to generate image data useable by the methods described herein.

Additionally, in some embodiments, the image processor 20 or another processor of the camera 10 may include other modules and/or can be configured to perform other processes, such as, for example, but without limitation, gamma correction processes, noise filtering processes, and/or the like.

As noted above, the camera 10 can also include a compression module 22. The compression module 22 can be in the form of a separate chip or it can be implemented with software and another processor. For example, the compression module 22 can be in the form of a commercially available compression chip that performs a compression technique in accordance with the JPEG 2000 standard, or other compression techniques. In some embodiments, the image processor 20 and/or the compression module 22 are implemented in a field-programmable gate array (FPGA), an application-specific integrated circuit (ASIC), combinations of the same or the like.

The compression module 22 can be configured to perform any type of compression process on the image data from the image processor 20. In some embodiments, the compression module 22 performs a compression technique that takes advantage of the techniques performed by the image processor 20. For example, as noted above, the image processor 20 can be configured to reduce the magnitude of particular color values of the image data. Additionally, the image processor 20 can perform a manipulation of raw data that uses the entropy of the image data. Thus, the compression technique performed by the compression module 22 can be of a type that benefits from the presence of larger strings of zeros to reduce the size of the compressed data output therefrom.

Further, the compression module 22 can be configured to compress the image data from the image processor 20 to result in a visually lossless output. For example, firstly, the compression module can be configured to apply any known compression technique, such as, but without limitation, JPEG 2000, MotionJPEG, any DCT based codec, any codec designed for compressing RGB image data, H.264, MPEG4, Huffman, or other techniques.

Depending on the type of compression technique used, the various parameters of the compression technique can be set to provide a visually lossless output. For example, many of the compression techniques noted above can be adjusted to different compression rates, wherein when decompressed, the resulting image is better quality for lower compression rates and lower quality for higher compression rates. Thus, the compression module can be configured to compress the image data in a way that provides a visually lossless output, or can be configured to allow a user to adjust various parameters to obtain a visually lossless output. For example, the compression module 22 can be configured to compress the image data at a compression ratio of about 6:1, 7:1, 8:1 or greater. In some embodiments, the compression module 22 can be configured to compress the image data to a ratio of 12:1 or higher.

Additionally, as described above, the compression module 22 can be configured to allow a user to adjust the compression ratio achieved by the compression module 22. For example, the camera 10 can include a user interface that allows a user to input commands that cause the compression module 22 to change the compression ratio. Thus, in some embodiments, the camera 10 can provide for variable compression. As described above, the user may specify other image quality characteristics in addition to compression ratio including, for example, frame rate, resolution, and/or the like. Such parameters may additionally be specified via a user interface as described above. In an embodiment the user may specify a sustainable quality level (as described above) and/or a maximum quality level (as also described above). Such quality levels may be used by the camera 10 when operating in the "video tagging mode" and "burst mode" respectively.

As used herein, the term "visually lossless" is intended to include output that, when compared side by side with original (never compressed) image data on the same display device, one of ordinary skill in the art would not be able to determine which image is the original with a reasonable degree of accuracy, based only on a visual inspection of the images. Additional aspects of the preferred compressed raw onboard image data handling capabilities are disclosed in U.S. Pat. No. 8,174,560, filed Apr. 11, 2008, entitled Video Camera, to Jannard et al., the entirety of which is hereby incorporated by reference herein.

With continued reference to FIG. 1A, the camera 10 can also include a storage device 24. The storage device can be in the form of any type of digital storage, such as, for example, but without limitation, hard disks, flash memory, or any other type of memory device (similar to the image buffer 36 described above). In some embodiments, the size of the storage device 24 can be sufficiently large to store image data from the compression module 22 corresponding to at least about 30 minutes of video at 12 mega pixel resolution, 12-bit color resolution, and at 60 frames per second. However, the storage device 24 can have any size.

In some embodiments, the storage device 24 can be mounted on an exterior of the housing 12. Further, in some embodiments, the storage device 24 can be connected to the other components of the system 14 through standard communication ports (via, for example, the input/output module 38), including, for example, but without limitation, IEEE 1394, USB 2.0, IDE, SATA, and/or the like. Further, in some embodiments, the storage device 24 can comprise a plurality of hard drives operating under a RAID protocol. However, any type of storage device can be used.

With continued reference to FIG. 1A, as noted above, in some embodiments, the system can include a monitor module 26 and a display device 30 configured to allow a user to view image data captured by the image sensor 18 during operation and/or various user interfaces. In some embodiments, the image processor 20 can include a subsampling system configured to output reduced resolution image data to the monitor module 26. For example, such a subsampling system can be configured to output video image data to support 5K, 4K, 2K, 1080p, 720p, or any other resolution. In some embodiments, filters used for demosaicing can be adapted to also perform downsampling filtering, such that downsampling and filtering can be performed at the same time. The monitor module 26 can be configured to perform any type of demosaicing process to the data from the image processor 20. Thereafter, the monitor module 26 can output a demosaiced image data to the display 30. The monitor module 26, in addition to, or in combination with the image processor 20, may be configured to generate any of the user interfaces described below. In some embodiments, image data output to the monitor module 26 may not be stored, but may be discarded. For example, the image data output to the monitor module 26 may be processed, as described above, and the processed image data may not be stored. However, in these embodiments, in some instances unprocessed image data (e.g., image data other than the image data output to the monitor module 26) may be stored. For example, in the continuous recording mode and/or when a burst capture is triggered (as described above and below), image data may be stored (e.g., recorded) in an unprocessed, uncompressed, format (e.g., raw image data), even as the image data may simultaneously be processed for display via the monitor module 26.

The display 30 can be any type of monitoring device. For example, but without limitation, the display 30 can be a four-inch LCD panel supported by the housing 12. For example, in some embodiments, the display 30 can be connected to an infinitely adjustable mount configured to allow the display 30 to be adjusted to any position relative to the housing 12 so that a user can view the display 30 at any angle relative to the housing 12. In some embodiments, the display 30 can be connected to the monitor module through any type of video cables such as, for example, an RGB or YCC format video cable.

Optionally, the playback module 28 can be configured to receive image data from the storage device 24, decompress and demosaic the image data, optionally generate a user interface (for example, any of the user interfaces described below) and then output the image data to the display 30. In some embodiments, the monitor module 26 and the playback module 28 can be connected to the display through an intermediary display controller (not shown). As such, the display 30 can be connected with a single connector to the display controller. The display controller can be configured to transfer data from either the monitor module 26 or the playback module 28 to the display 30.

In accordance with an embodiment, the camera 10 can comprise a portable housing having at least one handle configured to allow a user to manipulate the orientation with respect to at least one degree of movement of the housing during a video recording operation of the camera.

While embodiments of the disclosure are described in the context of a camera having certain characteristics and/or capabilities, such as a single sensor device, an image buffer of a particular size, or an input/output capability of a particular bandwidth, just to name a few, the embodiments may be applied to cameras having different characteristics (e.g., multi-sensor devices, larger or smaller buffers, etc.). Accordingly, it is to be understood that the embodiments disclosed herein are exemplary but non-limiting embodiments, and thus, the disclosure described herein are not limited to the disclosed exemplary embodiments.

Video Tagging Mode

Figure 2A:
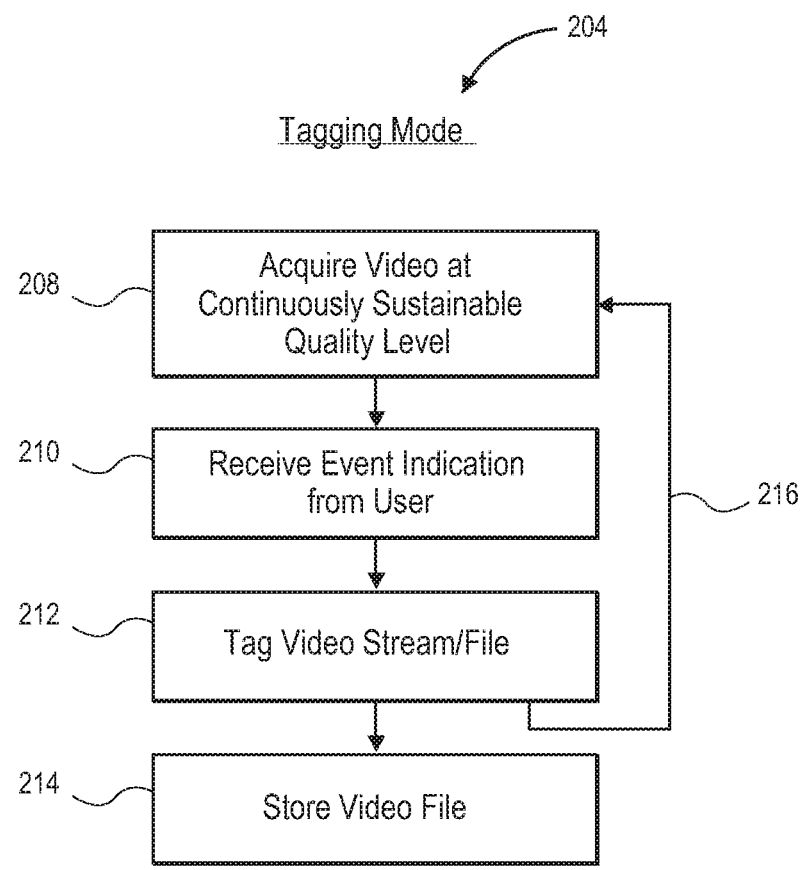
FIG. 2A is a flowchart illustrating an example method in which a user tags video image data, according to an embodiment.

FIG. 2A is a flowchart illustrating an example method 204 of the present disclosure in which the camera 10 is operated in the "video tagging mode," according to various embodiments. In various embodiments, fewer blocks or additional blocks may be included in the method, or various blocks may be performed in an order different from that shown in the figure. In an embodiment, one or more blocks in the figure may be performed by various components of the camera 10 as described above. For example, in some embodiments the example method 204 can represent a control routine stored in a memory device, such as the storage 24, or another storage device (not shown) within the camera 10. Additionally, a central processing unit (CPU) (not shown) can be configured to execute the control routine. The example method 204 may be performed, for example, when the user of the camera 10 has selected the "video tagging mode" via the mode selector 22, as described above.

At block 208, video (or image data, for example, images and/or sequences of images) may be continuously acquired by the camera 10 at a sustainable quality level, as described above. The camera may be operated by a user to, for example, capture video of various events. At block 210, an event indication may be received by the camera from the user. The user may provide the event indication when, for example, an event of interest is observed. The event indication may be provided, as described above, via a button press, a touch to a touch-sensitive display, a voice command, and/or the like.

At block 212, in response to receiving the event indication from the user, the image data (in this example, a video stream and/or video file) may be tagged, as described above, so as to identify the event of interest. As described above, a tag may comprise a marker, a pointer, metadata, and/or any other indicator associated with image data. In various embodiments, image data and associated tags may comprise a single file. Tags may be stored at a beginning, an end, and/or any middle portion of the single file. Alternatively, image data and associated tags may be separate files. In an embodiment, a tag provides a marker that the user identified an event of interest at a specific point in time while video was being captured. Accordingly, the tag may be associated with a timestamp. In an embodiment, the tag may also include various other items of information including, for example, a location, a quality level, a textual notation, an audio notation, an image notation, a video notation, and/or the like.

In an embodiment, a tag may identify or otherwise be associated with a captured sequence of images at a quality level different from, or the same as, the captured video. For example, in response to the user providing an indication of an event of interest, the camera may automatically capture an image, or a sequence of images, associated with the event (as described below). The captured image (or sequence of images) may be captured at a quality level different from the video. For example, the captured image (or sequence of images) may be captured at a higher quality level (for example, a higher resolution or a higher frame rate) as compared to the quality level at which the video is captured. In an example, the video may be captured at a sustainable quality level, while the image (or sequence of images) may be captured at a maximum quality level.

At block 214, the image data (for example, the video file) including the tags, may be stored/recorded. For example, the image data may be stored in the storage 24 and/or another storage device. In an embodiment, tagged image data may be continuously stored as it is captured and processed. As indicated by arrow 216, acquisition of image data may continue such that the user may continue to capture video while tagging multiple events over time.

Burst Capture Mode

Figure 2B:
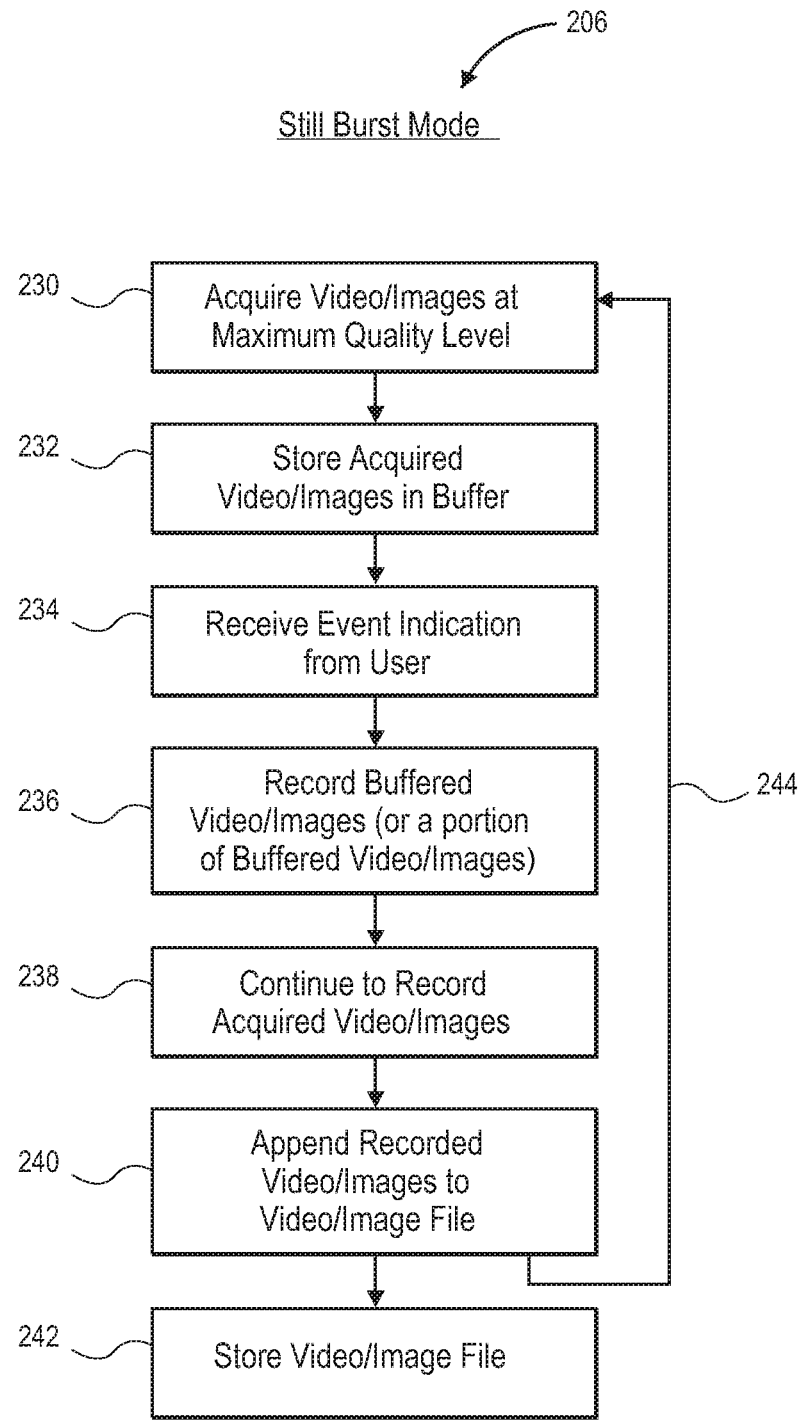
FIG. 2B is a flowchart illustrating an example method in which a user initiates recording of bursts of image data, according to an embodiment.

FIG. 2B is a flowchart illustrating an example method 206 of the present disclosure in which the camera is operated in the "burst mode," according to an embodiment. In various embodiments, fewer blocks or additional blocks may be included in the method, or various blocks may be performed in an order different from that shown in the figure. In an embodiment, one or more blocks in the figure may be performed by various components of the camera 10 as described above. For example, in some embodiments the example method 204 can represent a control routine stored in a memory device, such as the storage 24, or another storage device (not shown) within the camera 10. Additionally, a central processing unit (CPU) (not shown) can be configured to execute the control routine. The example method 206 may be performed, for example, when the user of the camera has selected the "burst mode" via the mode selector 22, as described above.

At block 230, camera 10 may acquire the image data (for example, video and/or sequences images). In some embodiments, the image data is acquired at a maximum available quality level, or some other relatively high quality level, as described above. The image data may be acquired continuously and, at block 232, as the image data is acquired it may be temporarily stored in the image buffer 36. Accordingly, depending on the size of the image buffer 36, the image buffer 36 may contain some amount (for example, an amount of time or a number of frames) of previously captured image data. As described above, the contents of image buffer 36 may be maintained in a first in, first out fashion. Accordingly, as new image frames are captured by the camera, those frames are added to image buffer 36, while any older image data may be removed from the image buffer 36. In an embodiment, no image data is recorded until the user provides an indication of an event of interest, as described below. As discussed, in the burst mode the camera 10 may be operating in a preview mode in which buffered frames are discarded, e.g., without being stored in the storage 24.

At block 234, an indication of an event of interest may be received from the user, as described above in reference to block 210 of flowchart 204.

At block 236, in response to receiving the indication of an event of interest, the camera records the image data stored in the image buffer 36, or a portion of the image data stored in the image buffer 36. Accordingly, in an embodiment the camera enables capture of image data occurring before the user provides an indication of an event of interest. In an embodiment, a portion of, rather than all of, the image data stored in the image buffer may be recorded. The portion recorded may include a particular amount of image data (for example, a number of bytes of image data), a particular amount of time of image data (for example, 5, 10, 15, 30, or more seconds of image data), a particular number of frames of image data (for example, 10, 25, 50, 100, 1000, or more frames of image data), and/or the like. In an embodiment, the user may configure the camera to store a particular amount of image data, for example, a particular number of seconds of image data, captured before the event of interest. In an embodiment, the portion of image data recorded from the image buffer may be determined by the camera based on one or more characteristics of the camera, a location of the camera, a type of event captured, and/or the like.

At block 238, further in response to the indication of an event of interest, the camera may continue to capture and/or record image data occurring after the indication of the event of interest. In an embodiment, the continued capture/recording of image data occurs until the user indicates that capture/recording is to stop, or until after a particular amount of image data, a particular amount of time of image data, and/or a particular number of frames of image data, among others, is captured. In an embodiment, the amount of image data captured/recorded after indication of the event may be user configurable. For example, the user may configure the camera to record a particular number of seconds of image data to capture/record after the indication of the event is received. In an embodiment, the camera automatically determines an amount of image data to captured/recorded after indication of the event based on one or more characteristics of the camera, a location of the camera, a type of event captured, and/or the like.

In an embodiment, the amount of image data captured/recorded after indication of the event may be determined based on hardware limitations of the camera. For example, when capturing image data at the maximum quality level, the camera may store the image data in a fast internal memory. The fast internal memory may be capable of storing the maximum quality image data as it is received, while the relatively slower storage 24 may not be capable of storing the maximum quality image data as it is received (due to, for example, hardware read/write and/or bandwidth limitations). However, the fast internal memory may be limited. Accordingly, in an embodiment the amount of image data captured/recorded after indication of the event may be limited to the storage capacity of the fast internal memory.

As described above, the image data stored in the buffer and captured after the indication is received may comprise video segments or sequences of images. For example, the camera may be configured to capture sequences of still images at a particular frame rate. In various embodiments, the quality level of the image data captured and/or recorded by the camera may be user configurable, as described above.

At block 230, the recorded image data, including the image data from the image buffer and the image data recorded from after the indication of the event, may be appended to any previously recorded image data (for example, a previously recorded video file). Accordingly, in an embodiment, the camera may create single image data file including image data captured in response to multiple events of interest. In an embodiment, the single image data file may include image data recorded when the camera is in the "video tagging mode" and when the camera is in the "burst mode." Accordingly, in an embodiment, multiple recorded videos, video segments, and/or sequences of images may advantageously be stored as a single file.

At block 232, the image data (for example, the appended image data) may be stored as described above in reference to the block 214 of flowchart 204. Additionally, as indicated by arrow 244, acquisition of image data may continue such that the user may record additional events over time.

Advantageously, according to various embodiments, while in the "video tagging mode" the camera is configured to enable a user to easily identify and tag events of interest while videoing an event. Additionally, in various embodiments, while the "burst mode" the camera is configured to enable a user to capture, via the camera, maximum quality level video segments and/or image sequences for a time period before and after events of interest. Accordingly, in various embodiments, the camera 10 enables capture and recording of video and images of events at a maximum quality level while also enabling continuous capture and recording of images and video of events at a sustainable quality level.

Example User Interfaces

FIGS. 3A-3B and 4-5 illustrate example user interfaces that display image data. In various embodiments, the user interfaces and associated methods present tagged image data in a manner that facilitates review of the tagged image data. In various embodiments, the user interfaces and associated methods also present sequences of images in a manner that facilitates review of the sequences of images. As described above, the example user interfaces may be generated by one or more software modules which may be executed by, for example, the image processor 20. In an embodiment, the user interfaces may be generated by combinations of the playback module 28, the monitor module 26, and/or another computing device external to the camera 10. The example user interfaces may be displayed on the display 30, which may be mounted on the camera 10, and/or on any other display. Each of the user interfaces of FIGS. 3A-3B and 4-5 may be used for display of image data captured in the "video tagging mode" and/or the "burst mode."

Figure 3A:
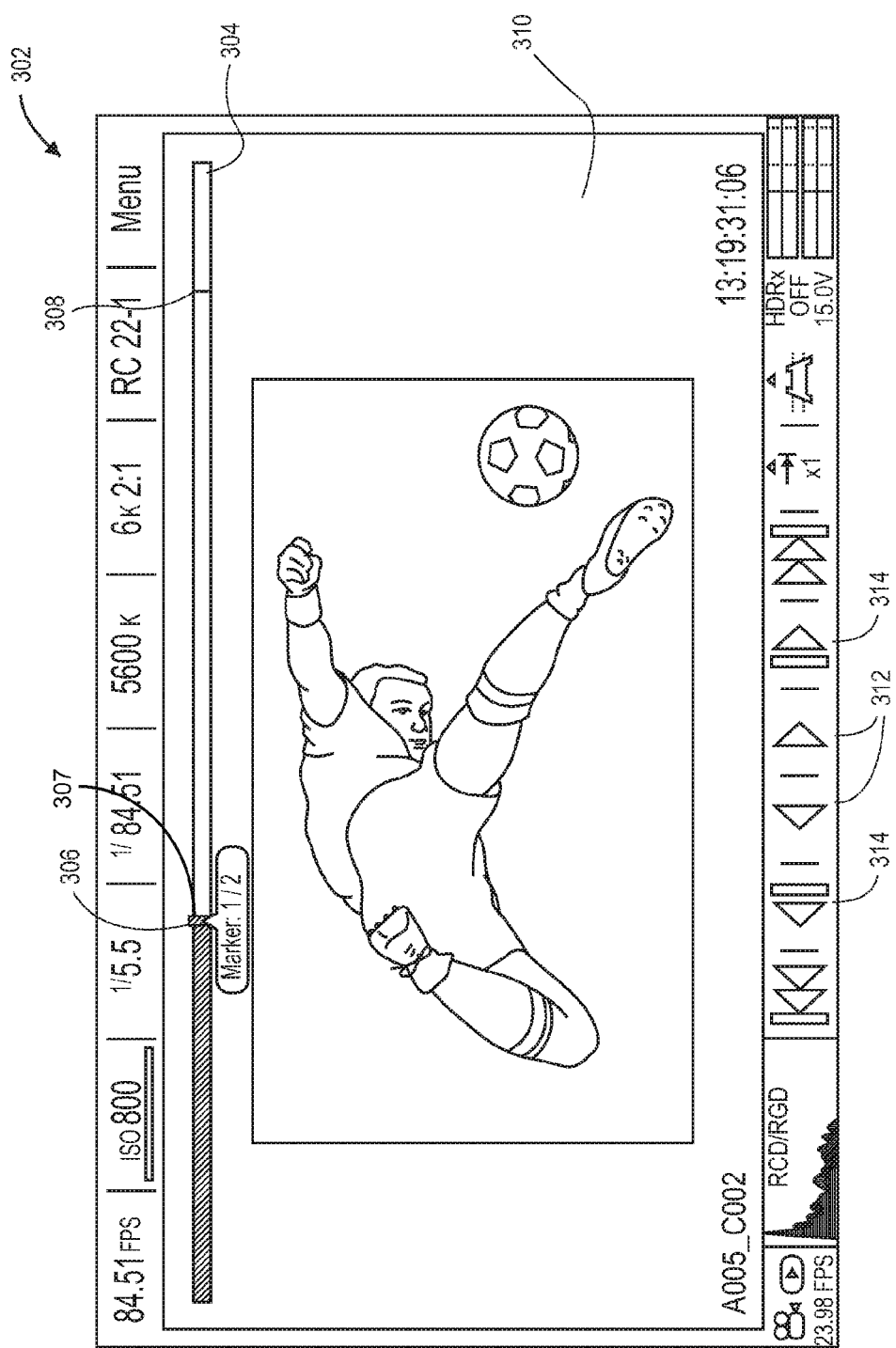
FIGS. 3A-3B illustrate example user interfaces that display image data.
Figure 3B:
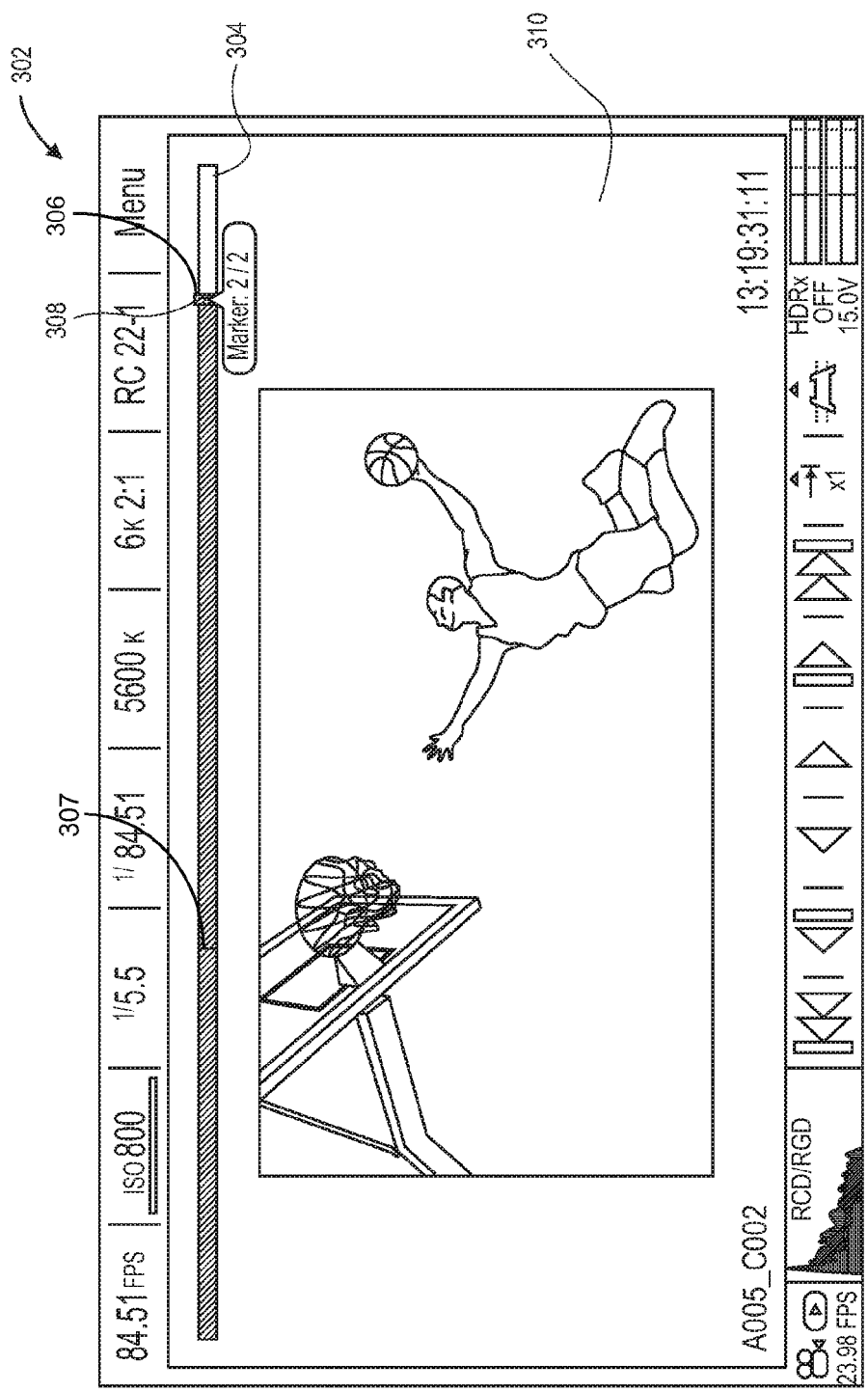

FIGS. 3A-3B illustrate an example user interface 302 in which image data is displayed in association with a timeline. As shown, the user interface 302 may include a timeline 304, a location indicator 306, event markers 307 and 308, and image data 310. The user interface 302 may also optionally include controls 312 and 314.

Referring to FIG. 3A, the location indicator 306 is located at event marker 307. Recorded image data 310 associated with the event marker 307 may be displayed. In the shown example, an image or video of an event (for example, a soccer player kicking a ball) associated with the event marker 307 is displayed. As shown, the user interface 302 may include popups or other indicators of a number of events or event markers. In an embodiment, the user may scrub the location indicator 306 along the timeline 304 to view image data associated with particular captured events. The image data 310 may include multiple images associated with an event, or multiple events, as described below in references to FIGS. 4-5. The controls 312 may be used to, for example, cause presentation of the image data (for example, play the video). The controls 314 may be used to, for example, move from one event marker to the next, forward or backward.

Referring to FIG. 3B, the location indicator 306 is located at the event marker 308. Recorded image data 310 associated with the event marker 308 is displayed, in this example, an image or video of an event (for example, a basketball player going for a basket) associated with the event marker 308 is shown.

In various embodiments, other information associated with the captured/recorded image data may be displayed in the user interface 302 including, for example, quality level information.

Figure 4:
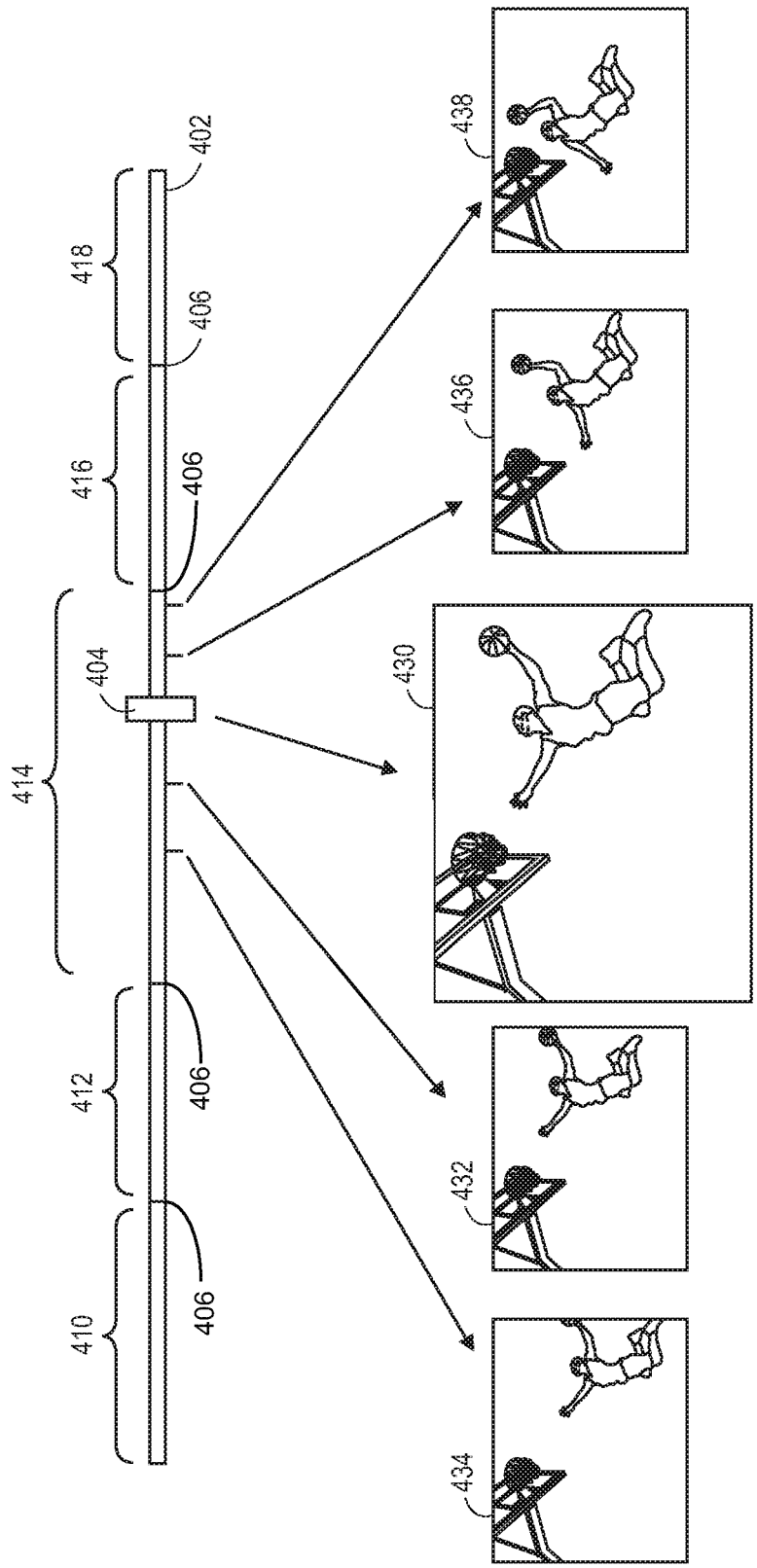
FIGS. 4-5 illustrate example user interfaces that display sequences of image data, according to various embodiments.

FIG. 4 illustrates an example user interface in which sequences of image data are displayed. The example user interface of FIG. 4 may include a timeline 402, a location indicator 404, and indicators 406 of breaks from one recorded event to another. As shown, the timeline 402 indicates that the displayed image data covers six separate events of interest corresponding to timeline segments 410, 412, 414, 416, and 418. Indicators 406 show beginning and ending points of captured image data corresponding to each event. The location indicator 404 is shown located within timeline segment 414 of the timeline 402.

In an embodiment, as the user moves the location indicator 404 along the timeline 402, corresponding image data may be displayed. In this example, five images 430, 432, 434, 436, and 438 are displayed. In the example, image 430 shows a thumbnail of image data corresponding to the exact location of the location indicator 404, images 432 and 434 show thumbnails of image data corresponding to the recorded data before the location indicator 404, and images 436 and 438 show thumbnails of image data corresponding to the recorded data after the location indicator 404.

In various embodiments more of fewer thumbnails may be displayed in the user interface of FIG. 3. In an embodiment as the user scrubs the location indicator 404 along the timeline 402, the displayed thumbnails are updated according to the location of the location indicator 404. In various embodiments thumbnails may be selected based on keyframes of the image data, a length of the image data associated with captured event, a number of frames or an amount of time from the location indicator 404, and/or the like. In an embodiment, the timeline 402 may also include indications of moments at which the user provided indications of the events of interest, as described below.

Figure 5:
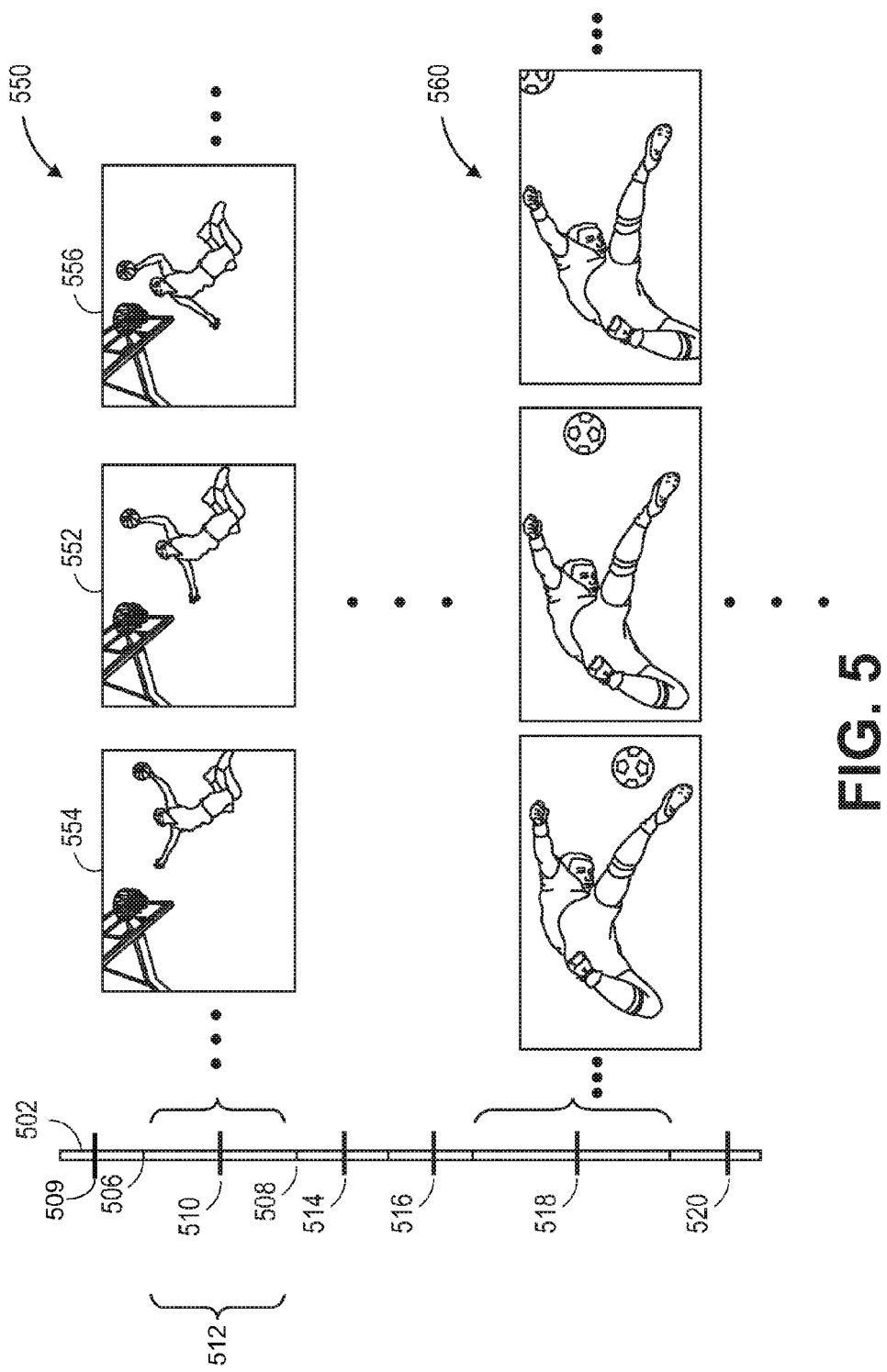

FIG. 5 illustrates an example user interface in which sequences of image data are displayed. The example user interface of FIG. 5 may include a timeline 502 (similar to timeline 402 of FIG. 4, but oriented vertically in the example of FIG. 5), indications of breaks from one recorded event to another (for example, indications 506 and 508), and indications of moments at which the user provided indications of the events (for example, indications 509, 510, 514, 516, 518, and 520). As shown, the timeline 502 indicates that the displayed image data covers six separate events of interest. For each event of interest, a series of thumbnail images may be shown (for example, images 550 and 650), providing the user a preview of the captured event. For the event indicated by bracket 512, images 550 (including 552, 554, and 556) show image data associated with the event. More or fewer images may be shown in each series of image. The images may be displayed sequentially as captured. In an embodiment, a middle image (for example, image 552) may correspond to the moment at which the user provided the indication of the event. In various embodiments, series of images may be displayed corresponding to each event recorded.

In various embodiments, either of the example user interfaces of FIG. 4 or 5 may be integrated with the example user interface user interface 302. In an embodiment, in either of the example user interfaces of FIG. 4 or 5, in response to a user providing a selection of a segment of the timeline corresponding to an event, the location indicator may be automatically moved to the moment at which the user provided the indication of the event corresponding to that segment.

Advantageously, according to various embodiments, any of the example user interfaces of FIGS. 3A-3B and 4-5 may enable the user to quickly navigate to and/or among the events of interest when reviewing the image data (for example, video or sequences of images).

Terms

In order to facilitate an understanding of the systems and methods discussed herein, a number of terms used in this disclosure are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

In the present disclosure, the term "image data" and/or "video image data" may refer to data comprising video, images, and/or sequences of images. Additionally, in various embodiments, the terms "video" and "sequence of images" may be used interchangeably. For example, in various embodiments a captured video may comprise a sequence of images captured at a particular frame rate. Accordingly, although some embodiments may be described with reference to capture of video (or sequences of images), it is to be understood that such embodiments may also be used for capture of sequences of images (or video).

In the present disclosure, the terms "acquisition" and "capture" may be used interchangeably to refer to any process by which the camera obtains image data. Additionally, the terms "record" and "store" may be used interchangeably to refer to any process by which the camera stores captured image data, e.g., in a file that can be accessed for later viewing. In various embodiments, as described below, processing and/or displaying of image data (for example, via a user interface) may be performed any time after capture of image data including, for example, before and/or after recording of image data.

In the present disclosure, the term "quality level" may refer to one or more characteristics (or combinations of characteristics) of captured and/or recorded image data (for example, video or sequences of images). For example, quality level may refer to, but is not limited to, one or more of a resolution, an aspect ratio, a frame rate, a compression level, a bit rate, one or more color characteristics, and/or the like. In various embodiments, the term "sustainable quality level" may be used to refer any quality level at which the camera is capable of sustaining continuous capture and/or recording of image data. Similarly, the term "maximum quality level" may be used to refer to any quality level at which the camera is not capable of sustaining continuous capture and/or recording of image data, but at which the camera is capable of capture and/or recording of less than continuous video segments and/or sequences of images. In general, the terms "video segment" and "image sequence" may be used to describe image data captured and/or recorded at a maximum quality level.

As various embodiments of the camera described herein may include various combinations of hardware capabilities and limitations (including, for example, limitations on image data processing, transfer, and/or storage speeds), what comprises a sustainable quality level may vary according to the embodiment. Additionally, various combinations of video characteristics may be considered sustainable quality level depending on characteristics of the camera. For example, in various embodiments each of the following is a non-limiting example of a quality level that may be a sustainable quality level: 1) a high frame rate and a low resolution; and 2) a low frame rate and a high resolution. Similarly, in these embodiments the following is a non-limiting example of a quality level that may be a maximum quality level: a high frame rate and a high resolution. In various embodiments other combinations of characteristics may comprise sustainable and/or maximum quality levels.

In the present disclosure, the term "event of interest" may refer to any event that may be captured and/or recorded by the camera. In general, events of interest include events which may be of interest to a user or observer. In various embodiments, events of interest may vary by context. For example, in a sports context events of interest may include exciting plays or moves of players in a sports game. In another example, in a film context events of interest may include particular action sequences or performances by actors. As described above and below, events of interest may be indicated by a user of the camera and/or may be automatically detected by the camera. Further, in various embodiments events of interest may include characteristics associated with the camera or other objects, for example, a time or a quality level, or a change in the time or the quality level.

In the present disclosure, the term "tag" may refer to any indication of an event of interest associated with image data. For example, a tag may comprise a marker, a pointer, metadata, and/or any other indicator. In general, in various embodiments image data and associated tags are stored as a single file. Tags may be stored at a beginning, an end, and/or any middle portions of the single file. Alternatively, image data and associated tags may be stored as separate files. In a simple example, a tag may comprise a marker at a particular point or an indicator of a particular point (for example, a timestamp) in image data indicating an occurrence of an event of interest. In various embodiments, tags may also include information associated with an event of interest, for example, a location, a quality level, a textual notation, an audio notation, an image notation, a video notation, and/or the like. In an embodiment, a tag on a video may include a captured sequence of images at a quality level different from, or the same as, the video. In various embodiments, tags may be associated with videos, video segments, and/or sequences of images.

In the present disclosure, for ease of description various functionality of the camera and/or other methods and systems may be described as "continuous". For example, the camera is described as "continuously" capturing/processing image data, an image buffer is "continuously" updated, and/or the like. While the term "continuous" is used for clarity of description, other methods of operation are explicitly contemplated including, for example, substantially continuous, intermittent, in batch, and/or the like. Accordingly, descriptions of "continuous" operations are to be understood to also encompass substantially continuous operations and/or the like (for example, substantially continuous updating of the image buffer, intermittent updating of the image buffer, and/or the like).

Additional Embodiments

Any process descriptions, elements, or blocks in the flow diagrams described herein and/or depicted in the attached figures should be understood as potentially representing modules, segments, or portions of code which include one or more executable instructions (as described below) for implementing specific logical functions or steps in the process. Alternate implementations are included within the scope of the embodiments described herein in which elements or functions may be deleted, executed out of order from that shown or discussed, including substantially concurrently (for example, through multi-threaded processing, interrupt processing, or multiple processors or processor cores or on other parallel architectures) or in reverse order, depending on the functionality involved.

Any of the methods and processes described above may be partially or fully embodied in, and partially or fully automated via, logic instructions, software code instructions, and/or software code modules executed by one or more general purpose processors and/or application-specific processors (also referred to as "computer devices," "computing devices," "hardware computing devices," "hardware processors," and the like). For example, the methods described herein may be performed as software instructions are executed by, and/or in response to software instruction being executed by, one or more hardware processors and/or any other suitable computing devices. The software instructions and/or other executable code may be read from a tangible computer-readable medium. A tangible computer-readable medium is a data storage device that can store data that is readable by a computer system and/or computing devices. Examples of computer-readable mediums include read-only memory (ROM), random-access memory (RAM), other volatile or non-volatile memory devices, DVD-ROMs, CD-ROMs, magnetic tape, flash drives, and/or optical data storage devices. Accordingly, a software module may reside in RAM memory, flash memory, ROM memory, EPROM memory, EEPROM memory, registers, hard disk, solid state drive, a removable disk, a CD-ROM, a DVD-ROM, and/or any other form of a tangible computer-readable storage medium.

Additionally, any of the methods and processes described above may be partially or fully embodied in, and partially or fully automated via, electronic hardware (for example, logic circuits, hardware processors, and/or the like). For example, the various illustrative logical blocks, methods, routines, and the like described in connection with the embodiments disclosed herein may be implemented as electronic hardware, computer software, or combinations of both. To clearly illustrate this, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

Many variations and modifications may be made to the above-described embodiments, the elements of which are to be understood as being among other acceptable examples. All such modifications and variations are intended to be included herein within the scope of this disclosure. The foregoing description details certain embodiments of the disclosure. It will be appreciated, however, that no matter how detailed the foregoing appears in text, the invention can be practiced in many ways. As is also stated above, the use of particular terminology when describing certain features or aspects of the disclosure should not be taken to imply that the terminology is being re-defined herein to be restricted to including any specific characteristics of the features or aspects of the invention with which that terminology is associated.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others.

The following are additional example embodiments of the systems and methods described herein. Any combinations of the following embodiments are included in the scope of this disclosure.

What is claimed is:

1. A device including an image sensor, the device comprising:
    an image sensor;
    an image data buffer configured to temporarily store image data acquired by the image sensor;
    a storage device configured to store an image data file include image data acquired by the image sensor; and
    one or more processors, wherein the device is configurable to operate in a first mode in which the one or more processors:
        cause continuous acquiring of image data by the image sensor at a first quality level;
        temporarily store the image data acquired at the first quality level in the image data buffer; and
        in response to receiving a user input identifying an event of interest as the image data is continuously acquired:
            store, to the image data file and from the image data buffer, at least a portion of the image data acquired at the first quality level corresponding to the event of interest; and
            store an indication of the event of interest with the image data file; and
    wherein the device is further configurable to operate in a second mode in which the one or more processors:
        cause continuous acquiring of image data by the image sensor at a second quality level; and
        store, to the image data file, the image data acquired at the second quality level.

2. The device of claim 1, wherein the device is configurable to operate in the first mode and the second mode simultaneously.

3. The device of claim 1, wherein the device is configurable to operate in the first mode and the second mode operate exclusively.

4. The device of claim 1, wherein the first quality level and the second quality level are defined by at least one of: resolution, frame rate, or compression level.

5. The device of claim 4, wherein the first quality level and the second quality level are independently user configurable.

6. The device of claim 5, wherein the first quality level and the second quality level are the same.

7. The device of claim 5, wherein the first quality level and the second quality level are different.

8. The device of claim 7, wherein the image data is acquired at a resolution of at least 1080p.

9. The device of claim 8, wherein the image data is acquired at a horizontal resolution of between 2 k and 10 k.

10. The device of claim 8, wherein the image data is acquired at a framerate of at least 12 frames per second.

11. The device of claim 10, wherein the image data is acquired at a framerate between 12 and 250 frames per second.

12. The device of claim 1, wherein the image data buffer is configured to store image data corresponding to a particular period of time or a particular number of frames.

13. The device of claim 1, wherein the image data comprises at least one of video data or sequences of image data.

14. The device of claim 1, wherein the user input is received by at least one of: a button, a touch-sensitive display, or an audio input.

15. The device of claim 1, wherein the device is further configurable to operate in a first mode in which the one or more processors:
discard remaining portions of the image data acquired at the second quality level that are temporarily stored in the buffer and that are not stored to the image data file.

16. The device of claim 15, wherein the at least a portion of the image data that is stored to the image data file comprises image data acquired after receiving the user input.

17. The device of claim 16, wherein the at least a portion of the image data that is stored to the image data file further comprises image data acquired before receipt of the user input.

18. The device of claim 17, wherein the following is user configurable:
respective amounts of image data that are stored to the image data file and acquired respectively before and after receiving the user input,
wherein the respective amounts of image data comprise at least one of: respective numbers of frames, or respective periods of time.

19. A method of acquiring image data, the method comprising:
in a first operational mode of a device configured to acquire image data by an image sensor:
continuously acquiring image data by the image sensor;
temporarily storing the image data in an image data buffer; and
in response to receiving a user input identifying an event of interest as the image data is continuously acquired:
storing, to an image data file and from the image data buffer, at least a portion of the image data corresponding to the event of interest; and
storing an indication of the event of interest with the image data file,
wherein the device is configurable to operate in at least two operational modes that are user configurable.

20. The method of claim 19 further comprising:
in a second operational mode of the device:
continuously acquiring image data by the image sensor at a second quality level different from a first quality level associated with the first operational mode; and
storing, to the image data file, the image data acquired at the second quality level.

21. The method of claim 19, wherein the at least a portion of the image data that is stored to the image data file comprises image data acquired both before and after receiving the user input.

22. The method of claim 21, wherein the following is user configurable:
respective amounts of image data that are stored to the image data file and acquired respectively before and after receiving the user input,
wherein the respective amounts of image data comprise at least one of: respective numbers of frames, or respective periods of time.

23. A device including an image sensor, the device comprising:
one or more processors, wherein the device is configurable to operate in a first operational mode in which the one or more processors:
cause continuous acquiring of image data by an image sensor of the device;
temporarily store the image data in an image data buffer of the device; and
in response to receiving a user input identifying an event of interest as the image data is continuously acquired:
store, to the image data file and from the image data buffer, at least a portion of the image data corresponding to the event of interest; and
store an indication of the event of interest with the image data file,
wherein the device is configurable to operate in at least two operational modes that are user configurable.

24. The device of claim 23, wherein the device is further configurable to operate in a second operational mode in which the one or more processors:
cause continuous acquiring of image data by the image sensor at a second quality level different from a first quality level associated with the first operational mode; and
store, to the image data file, the image data acquired at the second quality level.

25. The device of claim 23, wherein the at least a portion of the image data that is stored to the image data file comprises image data acquired both before and after receiving the user input.

26. The device of claim 25, wherein the following is user configurable:
respective amounts of image data that are stored to the image data file and acquired respectively before and after receiving the user input,
wherein the respective amounts of image data comprise at least one of: respective numbers of frames, or respective periods of time.

* * * * *